April 8, 1941.   H. W. TIEBEL   2,237,719
DISENGAGING MEANS FOR AUTOMATIC CONTROL SYSTEMS FOR AIRCRAFT
Filed Oct. 27, 1937   2 Sheets-Sheet 1

INVENTOR.
Hans Werner Tiebel
BY Stephen Cerstvik
ATTORNEY.

April 8, 1941.  H. W. TIEBEL  2,237,719
DISENGAGING MEANS FOR AUTOMATIC CONTROL SYSTEMS FOR AIRCRAFT
Filed Oct. 27, 1937  2 Sheets-Sheet 2

INVENTOR.
Hans Werner Tiebel
BY
Stephen Cerstvik
ATTORNEY.

Patented Apr. 8, 1941

2,237,719

UNITED STATES PATENT OFFICE 2,237,719

DISENGAGING MEANS FOR AUTOMATIC CONTROL SYSTEMS FOR AIRCRAFT

Hans Werner Tiebel, Berlin-Spandau, Germany, assignor to Siemens Apparate und Maschinen Gesellschaft mit beschrankter Haftung, Berlin, Germany, a corporation of Germany Application October 27, 1937, Serial No. 171,342
In Germany October 3, 1935

7 Claims. (Cl. 74—469)

This invention relates to disconnecting apparatus and more particularly to disengaging means for automatic control systems for aircraft.

Devices heretofore proposed for quickly engaging or disengaging a power shaft or control means have had the disadvantage in many instances of not properly compensating for wear upon the working parts whereby difficulty in the engaging and disengaging operations is encountered. Moreover, these prior art devices have been relatively complicated in design and heavy in construction.

One of the objects of the present invention is to provide a novel disconnecting apparatus which remains positive in engaging or disengaging action in spite of wear upon the working parts.

Another object of the invention is to provide novel apparatus for disengaging mechanical impulse transmitting means which is adapted for instant and positive operation.

A further object is to provide novel disconnecting means which are simple in design, light in weight and adapted for use, for example, aboard vehicles such as aircraft.

An additional object is to provide novel disengaging means which are small in size and adapted for installation aboard vehicles where available space is limited.

The above and further objects and novel features of the invention will more fully appear from the following detailed description when the same is read in connection with the accompanying drawings. It is to be expressly understood, however, that the drawings are for the purpose of illustration only and are not intended to define the limits of the invention, reference being primarily had for this latter purpose to the appended claims.

In the drawings, wherein like reference characters refer to like parts throughout the several views, Fig. 1 is a side elevation of one embodiment of the present invention;

The form of the invention illustrated in the accompanying drawings, by way of example, is a device for instantly disconnecting driving and driven members and comprises a power shaft with a driving arm rigidly attached thereto and a driven lever operatively connected to the driven member, said lever being rotatably mounted upon said driving shaft and adapted for supporting a latch which engages a toothed or grooved portion at the extremity of said driving arm. The latch may be instantly disengaged by the movement of a disconnecting lever which is operatively connected to a stub shaft upon which the latch is secured. The lever in the operating position extends radially from the axis of the driving shaft and is actuated by an impulse which initially is applied at a point concentric with the axis of the driving shaft.

Figure 1:
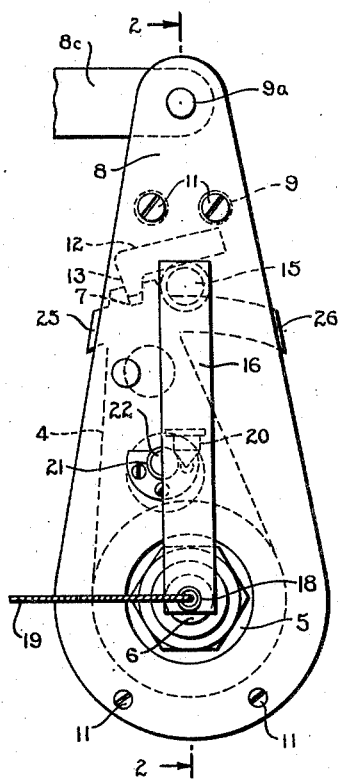
Figure 2:
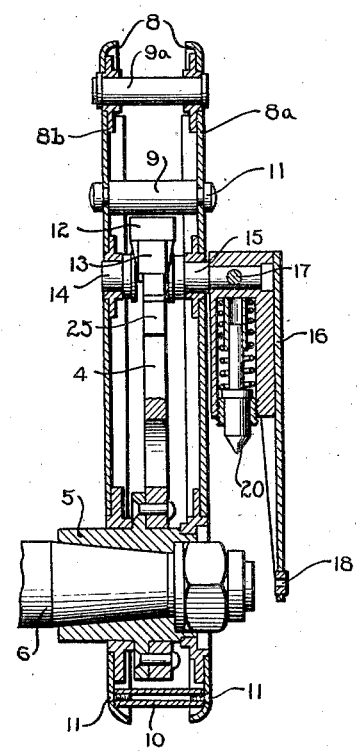
Fig. 2 is a partial section of the embodiment illustrated in Fig. 1, the section being taken on line II—II of Fig. 1.

In the form illustrated in Fig. 1, the novel disconnecting means are constituted by an arm 4 which is drivably connected by means of a sleeve 5 to a driving shaft 6. At the extremity of this arm is a toothed or grooved portion 7 for engaging a driven member. Novel means are provided for connecting said driven member to the driving arm comprising a lever 8 which is composed of two flange members 8a and 8b held in spaced relation by bolts 9, 10 and screws 11. Lever 8 is operatively connected to a driven member 8c by a bolt 9a. A latch member 12 having a bevelled, toothed portion 13 is supported between flanges 8a, 8b by journals 14, 15 and is adapted for engaging the grooved portion 7 of the driving arm 4 in such a manner that lever 8 is drivably connected to arm 4. Tooth 13 is bevelled in order to counteract the effects of wear and to insure a positive mesh at all times.

Novel means are provided for disengaging latch 12 from arm 4 comprising a disconnecting lever 16 which is operatively connected to journal 15 and latch 12 by a pin 17. Lever 16 in the engaged position extends radially from the axis of shaft 6 and is adapted for disengaging motion, by an impulse applied at 18, for example, by a cord 19.

In order to positively retain lever 8 and arm 4 in a firm driving connection regardless of the wear of the engaged parts, means are provided for urging lever 16 in a counter-clockwise direction, when in the engaged position, comprising a spring-loaded wedge plunger 20 attached to lever 16 and adapted for coaction with a small roller 21 upon a shaft 22 in such a manner that a turning moment is resiliently applied in the counter-clockwise direction to insure said firm driving connection.

Any suitable means may be provided for determining the relative positions of lever 8 and arm 4 such that the engagement of latch 12 and arm 4 may be facilitated and in the embodiment shown comprises feeler arms 25 and 26.

In operation, assume that the device is first in the engaged position, as shown in Fig. 1. Now assume that it is necessary instantly to disconnect the driving shaft 6 and the driven member 8c. The cord 19 is pulled in the direction of the arrow which applies a turning moment at 18. The spring loaded wedge-plunger 20 resiliently opposes this disengaging impulse but is thrust upwardly against spring pressure upon roller 21. Simultaneously, latch 12 is lifted from engagement with the grooved extremity of arm 4 and plunger 20 has reached the opposite side of roller 21. In this position, arm 4 and lever 8 are disengaged. When it is desired again to engage said arm and lever, the feeler arms 25, 26 may be used to aid in the coupling.

Figure 3:
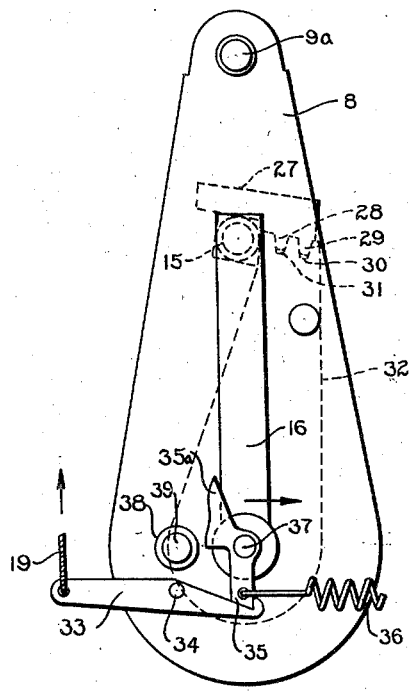
Fig. 3 is a side elevation of a second embodiment of the present invention; and, Fig. 4 is an isometric sketch of one embodiment of the invention in operative connection with a servo-motor and a vehicle control surface.

A second embodiment of the present invention is illustrated in Fig. 3 which is similar to the first embodiment with the main exception that instead of a direct impulse from the operator being effective to actuate the device, the operator trips a pawl mechanism which releases a spring which, in turn, by operating a cam, forces the mechanism to the disconnected position. A latch member 27 of the second embodiment is similar to member 12 of the first embodiment with the exception that double teeth 28, 29 are provided in the former to mesh with double grooves 30, 31 of driving arm 32. Arm 32, in turn, corresponds to driving arm 4 of the first embodiment.

The novel pawl means of the second embodiment for actuating the disconnecting device are comprised by pawl 33 pivotally mounted at 34 and adapted, upon a pull of cord 19, to release a cam-lever 35 and to permit a spring 36 to rotate said cam-lever upon a pivot 37 on lever 16 in such a manner that a cam portion 35a is thrust into contact with a roller 38 upon a small shaft 39. The contact of cam and roller will force the disconnecting lever 16, in the embodiment shown in Fig. 3, in a counterclockwise direction which will lift latch 27 from engagement with driving arm 32 and thus disconnect the driving and driven members. It is noted that the mechanical advantage of the cam 35a acting upon lever 16 decreases as the cam is rotated.

In operation of the second embodiment, assume that it is necessary to instantly disconnect the driving and driven members. Cord 19 is pulled in the direction of the arrow which rotates pawl 33 and releases cam-lever 35. Spring 36 rotates said cam-lever and causes cam 35a to coact with roller 38 to thrust the disconnecting lever 16 to the right and to disengage latch 27 and arm 32. The cam 35a is so formed that upon rotation of said cam the largest turning moment upon lever 16 is produced at the beginning of the disconnecting movement.

Figure 4:
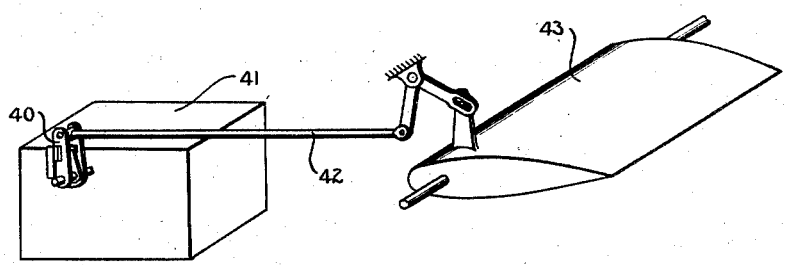

In Fig. 4 is illustrated one manner of employing the present invention with a vehicle control surface which in the coupled position is automatically governed. The disconnecting apparatus 40 is attached to an automatic control device 41. The driven member of the apparatus is attached to a rod 42 which, in turn, governs a control surface 43.

There is thus provided a novel coupling device which is adapted for instant disconnection and which is suitable for installation upon automatic vehicle control apparatus in order that, for example, in the event of an emergency, the control surfaces may be quickly released from automatic control. The device will maintain a positive driving connection when in the operative position in spite of wear upon the working surfaces. It is light in weight, simple in construction and easily installed aboard vehicles such as marine vessels and aircraft where a limited amount of space is available.

Although only two embodiments have been illustrated and described in detail, it is to be expressly understood that the invention is not limited thereto. For example, in the form shown, the disconnecting lever 16 is actuated by pulling upon a cord 19; however, for this cord may be substituted electric or hydraulic lever actuating means. Also for the latch mechanism may be substituted any suitable, quickly disconnectable locking means. Various changes may also be made in the design and arrangement of parts illustrated, without departing from the spirit and scope of the invention, as the same will now be understood by those skilled in the art. For a definition of the limits of the invention, reference will be had primarily to the appended claims.

What is claimed is:

1. In a disconnecting device, a driving shaft, a driving arm attached to said shaft, a driven lever rotatably mounted upon said shaft, a latch supported by said lever for engaging said driving arm, a roller member mounted on said driven lever, and means connected with said latch and having a portion thereof engaging said roller for rapidly disconnecting said latch from said driving arm.

2. In apparatus of the class decribed, a driving arm, a driven lever, latch means for coupling said arm and lever, lever means for disengaging said latch means, and means for bringing said arm and lever into the coupled position comprising feeler arms upon said driving arm.

3. In apparatus of the class described, a driving arm, a driven lever, latch means for coupling said arm and lever, lever means for disengaging said latch, spring means for actuating said disengaging lever, pawl means for holding said disengaging lever in the coupled position, and means for releasing said pawl.

4. In apparatus of the class described, a driving arm, a driven lever, latch means for coupling said arm and lever, disengaging lever means for controlling said latch means, a cam-lever attached to said disengaging lever, spring means for actuating said cam-lever, and pawl means for holding said disengaging lever in the coupled position.

5. In apparatus of the class described, a driving arm, a driven lever, latch means for coupling said arm and lever, disengaging lever means for controlling said latch means, cam means for actuating said disengaging lever, spring means for actuating said cam means, and pawl means for holding said cam in an inoperative position.

6. In a device of the character described, a driving shaft, a driving arm attached to said shaft, a driven element comprising a pair of parallel plates on opposite sides of said arm and rotatably mounted on said shaft, a pawl journalled in said plates and mounted adjacent said arm, means on said arm cooperating with said pawl whereby said driven element may be rotated upon rotation of said shaft, a roller member supported on one of said plates, and means connected with said pawl for disconnecting said pawl from the means on said arm, said disconnecting means having a portion thereof engaging said roller member during the disconnecting operation.

7. In a device of the character described, a driving shaft, an arm attached to said shaft for rotation therewith, a driven member and means for connecting and disconnecting said arm and member comprising a pair of plates mounted for rotation on said shaft, on opposite sides of said arm, a pawl journalled in said plates, means on said arm cooperating with said pawl whereby said arm and plates are adjustably locked together, a lever attached to said pawl for rotating the same, a spring urged detent on said lever and means cooperating with said detent to urge said lever in such a direction that said pawl and arm are maintained in locked position.

HANS WERNER TIEBEL.